(12) United States Patent
Uemichi

(10) Patent No.: US 11,054,572 B2
(45) Date of Patent: Jul. 6, 2021

(54) FILTER DEVICE AND FILTER

(71) Applicant: FUJIKURA LTD., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 36 days.

(21) Appl. No.: 16/617,400

(22) PCT Filed: May 29, 2018

(86) PCT No.: PCT/JP2018/020455
§ 371 (c)(1),
(2) Date: Nov. 26, 2019

(87) PCT Pub. No.: WO2018/221486
PCT Pub. Date: Dec. 6, 2018

(65) Prior Publication Data
US 2021/0124111 A1    Apr. 29, 2021

(30) Foreign Application Priority Data

May 30, 2017  (JP) .............................. JP2017-106914

(51) Int. Cl.
*H01P 5/08*       (2006.01)
*G02B 6/02*       (2006.01)
*G02B 6/38*       (2006.01)

(52) U.S. Cl.
CPC ....... *G02B 6/02052* (2013.01); *G02B 6/3817* (2013.01); *H01P 5/08* (2013.01)

(58) Field of Classification Search
CPC .................................................... H01P 1/2138
See application file for complete search history.

(56) References Cited

U.S. PATENT DOCUMENTS 4,052,724 A * 10/1977 Takeichi ............... H01P 1/2138
                                                             343/786
5,349,314 A    9/1994 Shimizu et al.
(Continued)

FOREIGN PATENT DOCUMENTS

EP    0883328 A1    12/1998
GB    2497982 A      7/2013
(Continued)

OTHER PUBLICATIONS

Notification of Transmittal of Copies of Translation of the International Preliminary Report on Patentability (Form PCT/IB/338) of International Application No. PCT/JP2018/020455 dated Dec. 12, 2019 with Forms PCT/IB/373 and PCT/ISA/237 with English translation. (14 pages).

(Continued)

*Primary Examiner* — Charlie Y Peng
(74) *Attorney, Agent, or Firm* — Westerman, Hattori, Daniels & Adrian, LLP

(57) ABSTRACT

A filter device including a filter and waveguide tubes broadens a band in which return loss is small. A filter device (1) includes: a filter (11) including wide walls (13, 14) and narrow walls (16); and first and second waveguide tubes (21, 31). The filter 11 includes first and second columnar conductors (pins 18 and 19) each passing through an opening (13a1 or 13a2) which is provided in the wide wall (conductor layer 13) and having one end portion (181, 191) located inside the substrate (12). The first and second waveguide tubes (21, 31) are placed such that each of the first and second columnar conductors (pin 18, 19) passes through an opening (22a, 23a) and such that another end portion (182, 192) of each of the columnar conductors (pin 18, 19) is located inside the waveguide tube (21, 31).

10 Claims, 6 Drawing Sheets

(56) References Cited

U.S. PATENT DOCUMENTS

| | | | |
|---|---|---|---|
| 5,731,751 A | 3/1998 | Vangala | |
| 2004/0041663 A1* | 3/2004 | Uchimura | H01P 1/2088 |
| | | | 333/135 |
| 2012/0126373 A1 | 5/2012 | Seo et al. | |
| 2012/0206311 A1* | 8/2012 | Lee | H01Q 13/10 |
| | | | 343/785 |

FOREIGN PATENT DOCUMENTS

| | | | |
|---|---|---|---|
| JP | H03_077402 A | 4/1991 | |
| JP | H04-287501 A | 10/1992 | |
| JP | H10135714 A | 5/1998 | |
| JP | 2005-051331 A | 2/2005 | |
| JP | 2005-102024 A | 4/2005 | |
| JP | 2014-179935 A | 9/2014 | |
| JP | 2015-080100 A | 4/2015 | |
| JP | 2015-226109 A | 12/2015 | |
| JP | 2016-006918 A | 1/2016 | |
| JP | 6140872 B1 | 5/2017 | |
| JP | 6190932 B1 | 8/2017 | |

OTHER PUBLICATIONS

International Search Report dated Jun. 26, 2018, issued in counterpart application No. PCT/JP2018/020455. (3 pages).
Uemichi, Y. et. al, "Compact and low-loss bandpass filter realized in silica-based post-wall waveguide for 60-GHz applications", IEEE MTT-S IMS, May 2015.
Yoshida, Kazuaki, "Technology and Applications of Microwave Filters", Japan Radio Technical Report, JRC Nihon Musen, No. 64, pp. 2013-12 to 16. (15 pages).

* cited by examiner

FILTER DEVICE AND FILTER

TECHNICAL FIELD

The present invention relates to a filter device in which a filter and two waveguide tubes are coupled to each other. The present invention also relates to a filter capable of being coupled to the waveguide tubes.

BACKGROUND ART

As filters used in millimeter wave band, filters using a waveguide tube made of a metal are widely known. FIG. 8 in Non-Patent Literature 1 illustrates a filter which can be coupled to a rectangular waveguide tube being rectangular in cross section at opposite ends thereof. This filter includes a plurality of resonators that are formed by cutting a metal block. At a boundary between the adjacent resonators is provided a coupling window for electromagnetically coupling the resonators to each other. Such a filter constructed by coupling a plurality of resonators to each other is called a resonator coupled filter.

The properties of this filter depend on a resonance frequency of each resonator and a coupling coefficient between the resonators. The resonance frequency is a physical quantity which is determined by the size of each resonator, and the coupling coefficient is a physical quantity which is determined by the size of the coupling window. Accordingly, the properties of the filter disclosed in Non-Patent Literature 1 strongly depend on the size of the filter itself.

Thus, in a case where the temperature of an external environment changes, the properties of the filter disclosed in Non-Patent Literature 1 vary according to the temperature change. In other words, the filter disclosed in Non-Patent Literature 1 is a highly temperature dependent filter. Variation of the properties of the filter will cause transmission of electromagnetic waves included in a band that are supposed to be reflected. Thus, the filter disclosed in Non-Patent Literature 1 is not suitable for use in an environment in which the temperature changes dramatically.

Examples of a filter having properties that are less temperature dependent include a filter disclosed in Non-Patent Literature 2. The filter disclosed in Non-Patent Literature 2 is a resonator-coupled constituted by a post-wall waveguide (PWW). In the PWW included in this filter, a region which is rectangular in cross-sectional shape and is surrounded by a pair of conductor layers provided on respective opposite surfaces of a substrate made of a dielectric and by a post wall constituted by a plurality of conductor posts which are placed in the substrate in a fence-like manner, functions as a propagation region through which electromagnetic waves propagate.

Note that since the substrate which is a constituent member of the PWW is small in thickness, the width of the pair of conductor layers in a cross section of the propagation region is greater than the height of the post wall (equal to the thickness of the substrate) in the cross section. Thus, in the PWW, the pair of conductor layers is also called a pair of wide walls, and the post wall is also called narrow walls. In a case where directions parallel to a normal to the pair of wide walls are referred to as upper and lower directions, directions parallel to a direction of propagation of electromagnetic waves are referred to as anterior and posterior directions, directions orthogonal to the upper and lower directions and to the anterior and posterior directions are referred to as left and right directions, the pair of wide walls surrounds the propagation region from the upper and lower directions, the narrow walls surround the propagation region from the anterior and posterior directions and from the left and right directions. Note that, of all the narrow walls, narrow walls surrounding the propagation region from the left and right directions are also referred to as side walls, and narrow walls surrounding the propagation region from the anterior and posterior directions are also referred to as short walls.

The filter disclosed in Non-Patent Literature 2 employs quartz glass as a dielectric material constituting the substrate. Quartz glass has a small linear expansion coefficient in comparison with metal. Thus, in a case where the temperature of the external environment greatly changes (in a case where the temperature of the external environment changes in a range of, for example, not less than −25° C. and not more than 100° C.), the amount of change in size of the filter itself is small, as compared to the filter disclosed in Non-Patent Literature 1. Therefore, the properties of this filter have low temperature dependence, as compared to the filter disclosed in Non-Patent Literature 1.

CITATION LIST

Patent Literature

[Patent Literature 1]
Japanese Patent Application Publication Tokukai No. 2015-80100
[Patent Literature 2]
Japanese Patent Application Publication Tokukai No. 2015-226109
[Patent Literature 3]
Japanese Patent Application Publication Tokukai No. 2016-6918

Non-Patent Literature

[Non-Patent Literature 1]
Kazuaki Yoshida, "Technology and Applications of Microwave Filters", Japan Radio Co., Ltd. (JRC) Review No. 64, December 2013.
[Non-Patent Literature 2]
Y. Uemichi, et. al, "Compact and low-loss bandpass filter realized in silica-based post-wall waveguide for 60-GHz applications", IEEE MTT-S IMS, May 2015.

SUMMARY OF INVENTION

Technical Problem

A filter is a passive device that limits a center frequency and bandwidth of electromagnetic waves to be transmitted. However, the coupling section between the filter and the waveguide tube is required to reduce return loss over a wide band. This is because the filter must limit a band of electromagnetic waves, and it is not preferable that the bandwidth is limited by the coupling section between the filter and the waveguide tube.

Unfortunately, the filter disclosed in Non-Patent Literature 2, when connected with a waveguide tube, tends to have large return loss, and it is thus difficult to broaden a bandwidth in which reflection loss is small. This problem will be described below.

Patent Literatures 1 to 3 each disclose, as described below, transmission lines in which a waveguide tube is coupled to one end portion of the PWW. These transmission lines can be used as a structure for coupling the filer and waveguide tube disclosed in Non-Patent Literature 2 to each other.

In the transmission line illustrated in FIGS. 1 to 4 of Patent Literature 1 (in Patent Literature 1, the transmission line is described as "connection structure"), a coupling window is provided by omitting a short wall of the PWW, and part of the short wall of the waveguide tube is opened (in Patent Literature 1, the short wall is described as "closure structure"). In this transmission line, the open part of the short wall in the waveguide tube faces the coupling window of the PWW so that the PWW and the waveguide tube are coupled to each other.

In the transmission line illustrated in FIGS. 1 to 3 of Patent Literature 2 (in Patent Literature 2, the transmission line is described as "transmission mode converting device"), the PWW and the waveguide tube are placed in such a manner that they share a conductor layer provided on one surface of the substrate. This conductor layer functions as one wide wall of the PWW and also functions as one wide wall of the waveguide tube (see FIG. 3). To the wide wall shared by the PWW and the waveguide tube are provided four rectangular coupling windows. In this transmission line, the PWW and the waveguide tube are coupled to each other via these four coupling windows.

In the transmission line illustrated in FIGS. 1 and 2 of Patent Literature 3, a coupling window is provided in one wide wall of the PWW, and a short wall of the waveguide tube is opened. In this transmission line, a part of the wide wall where the coupling window is provided in the PWW faces an open cross section of the short wall of the waveguide tube so that the PWW and the waveguide tube are coupled to each other.

Further, the transmission lines disclosed in Patent Literatures 1 to 3 employ a microstrip line (MSL) as a planar transmission path to be coupled to an end portion of the PWW on a side away from another end portion thereof on a side to which the waveguide tube is connected, wherein the MSL includes a signal line and a ground layer. Those transmission lines include a columnar conductor (for example, in Patent Literature 3, the columnar conductor is described as a power feeding pin) that converts a mode of propagating through the inside of the PWW into a mode of propagating through the inside of the MSL. This columnar conductor couples the PWW and the waveguide tube.

The above-described transmission lines as disclosed in Patent Literatures 1 to 3, in a case where they are used as a transmission line in which a filter and a waveguide tube are coupled to each other, are required to have small return loss (e.g., return loss of −15 dB or less) over a wide band (e.g., in the case of operation in the E-band, not less than 71 GHz to not more than 86 GHz).

For example, in a case where −15 dB is set as a threshold value against which to judge return loss, the bandwidths of all of the transmission lines disclosed in Patent Literatures 1 to 3 are less than 10 GHz (see FIG. 9 of Patent Literature 1, FIG. 13 of Patent Literature 2, and FIG. 4 of Patent Literature 3). These bandwidths are not sufficient for transmission lines in which a filter and waveguide tubes are coupled to each other, and the conventional transmission lines have room for broadening of the band.

The present invention has been made in view of the above problem, and it is an object of the present invention to broaden a band in which return loss is small in a filter device including (i) a filter using a PWW and (ii) waveguide tubes coupled to the filter.

Solution to Problem

In order to solve the above problem, a filter device in accordance with an aspect of the present invention is a filter device, including: a filter comprising a substrate made of a dielectric, a pair of wide walls being constituted by a first conductor layer and a second conductor layer, respectively, and covering respective opposite surfaces of the substrate, and narrow walls being constituted by post walls which are provided inside the substrate; and a first waveguide tube and a second waveguide tube each including a tube wall made of a conductor and being placed along the substrate.

The filter further includes: a first columnar conductor passing through a first opening which is provided in the first conductor layer, the first columnar conductor having one end portion located inside the substrate; and a second columnar conductor passing through a second opening which is provided in the first conductor layer or the second conductor layer, the second columnar conductor having one end portion located inside the substrate.

The first waveguide tube is placed such that the first columnar conductor passes through an opening which is provided in the tube wall of the first waveguide tube and such that another end portion of the first columnar conductor is located inside the first waveguide tube, and the second waveguide tube is placed such that the second columnar conductor passes through an opening which is provided in the tube wall of the second waveguide tube and such that another end portion of the second columnar conductor is located inside the second waveguide tube.

In order to solve the above problem, a filter in accordance with an aspect of the present invention is a filter including: a substrate made of a dielectric; a pair of wide walls being constituted by a first conductor layer and a second conductor layer, respectively, and covering respective opposite surfaces of the substrate; and narrow walls being constituted by post walls which are provided inside the substrate, the filter further including: a first columnar conductor passing through a first opening which is provided in the first conductor layer, the first columnar conductor having one end portion located inside the substrate; and a second columnar conductor passing through a second opening which is provided in the first conductor layer or the second conductor layer, the second columnar conductor having one end portion located inside the substrate.

Advantageous Effects of Invention

A filter device and a filter in accordance with an aspect of the present invention can broaden a band in which return loss is small.

Figure 2:
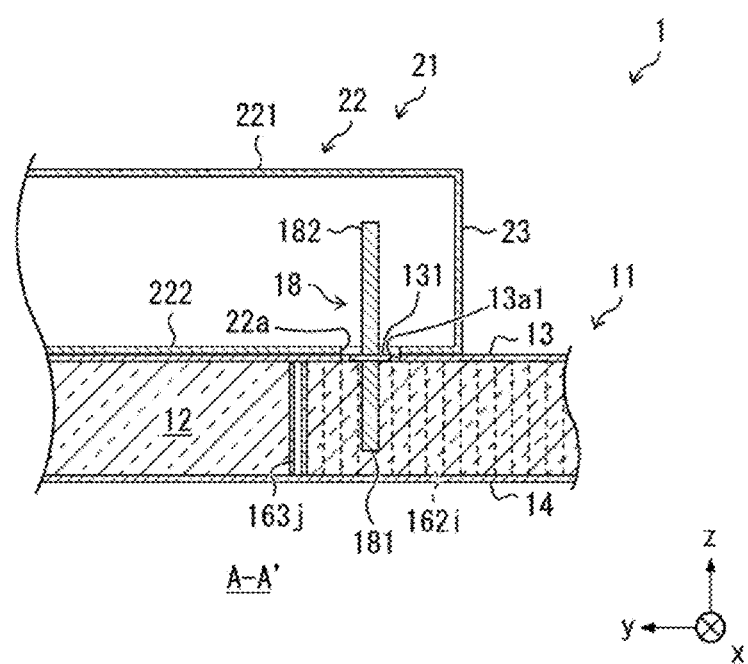
FIG. 2 is a cross-sectional view illustrating a PWW-waveguide tube converting section included in the filter device illustrated in FIG. 1.
Figure 3:
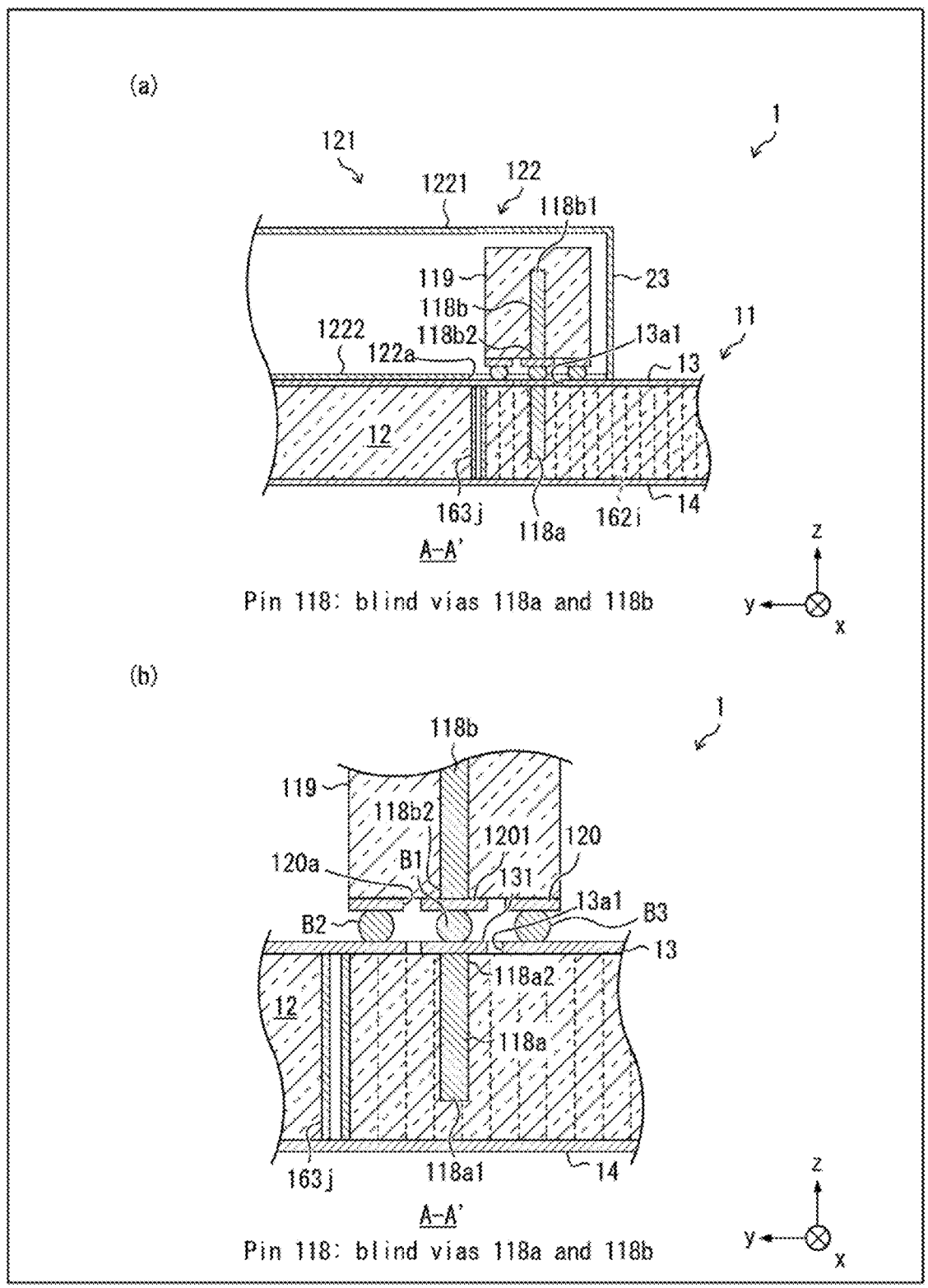

(a) of FIG. 3 is a cross-sectional view illustrating a transmission line that includes a variation of a PWW-waveguide tube converting section illustrated in FIG. 2. (b) of FIG. 3 is an enlarged cross-sectional view illustrating the PWW-waveguide tube converting section illustrated in (a) of FIG. 3.

Figure 4:
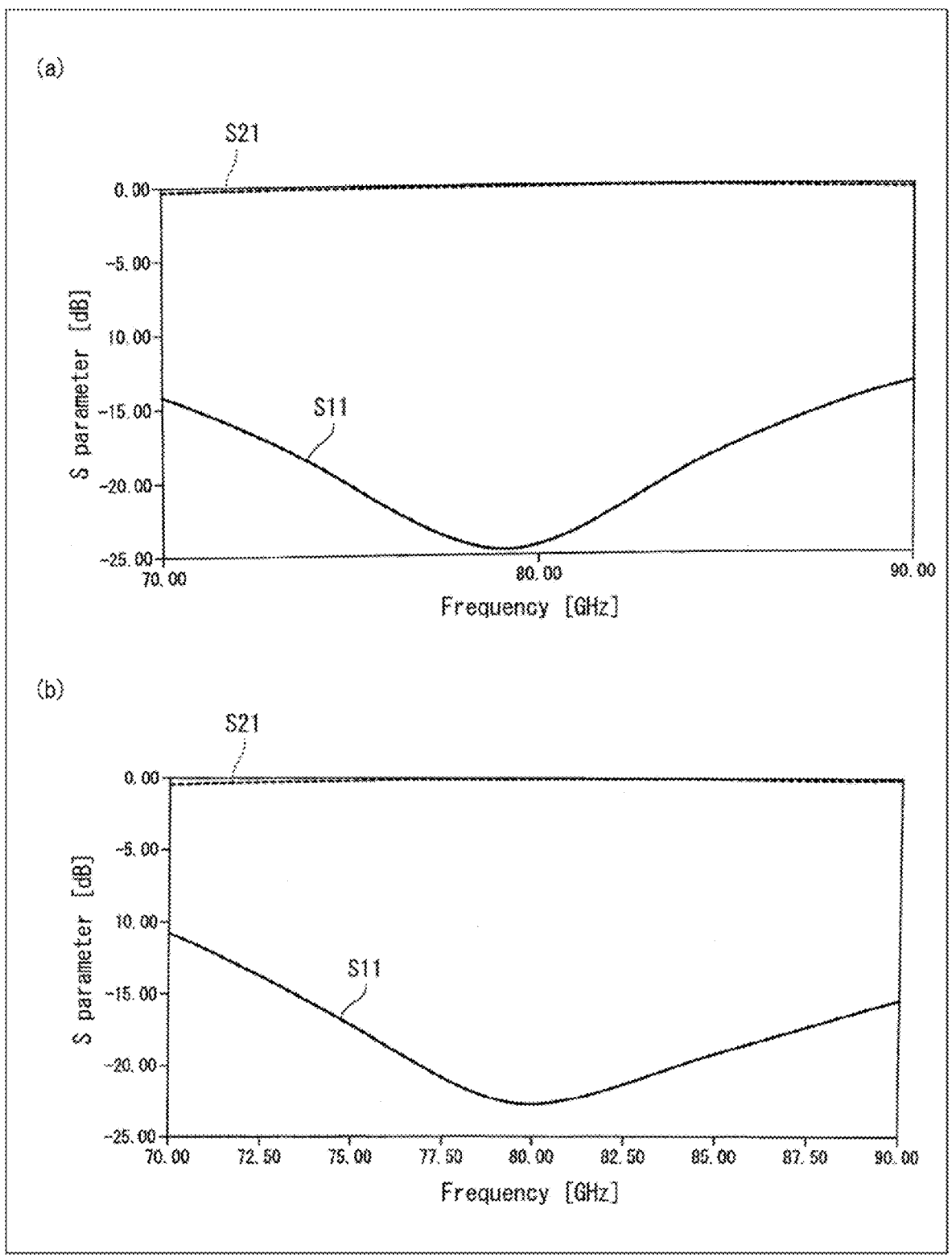

(a) of FIG. 4 is a graph showing reflection characteristics and transmission characteristics of a PWW-waveguide tube converting section included in a filter device in Example 1 of the present invention. (b) of FIG. 4 is a graph showing reflection characteristics and transmission characteristics of a PWW-waveguide tube converting section included in a filter device in Example 2 of the present invention.

Figure 5:
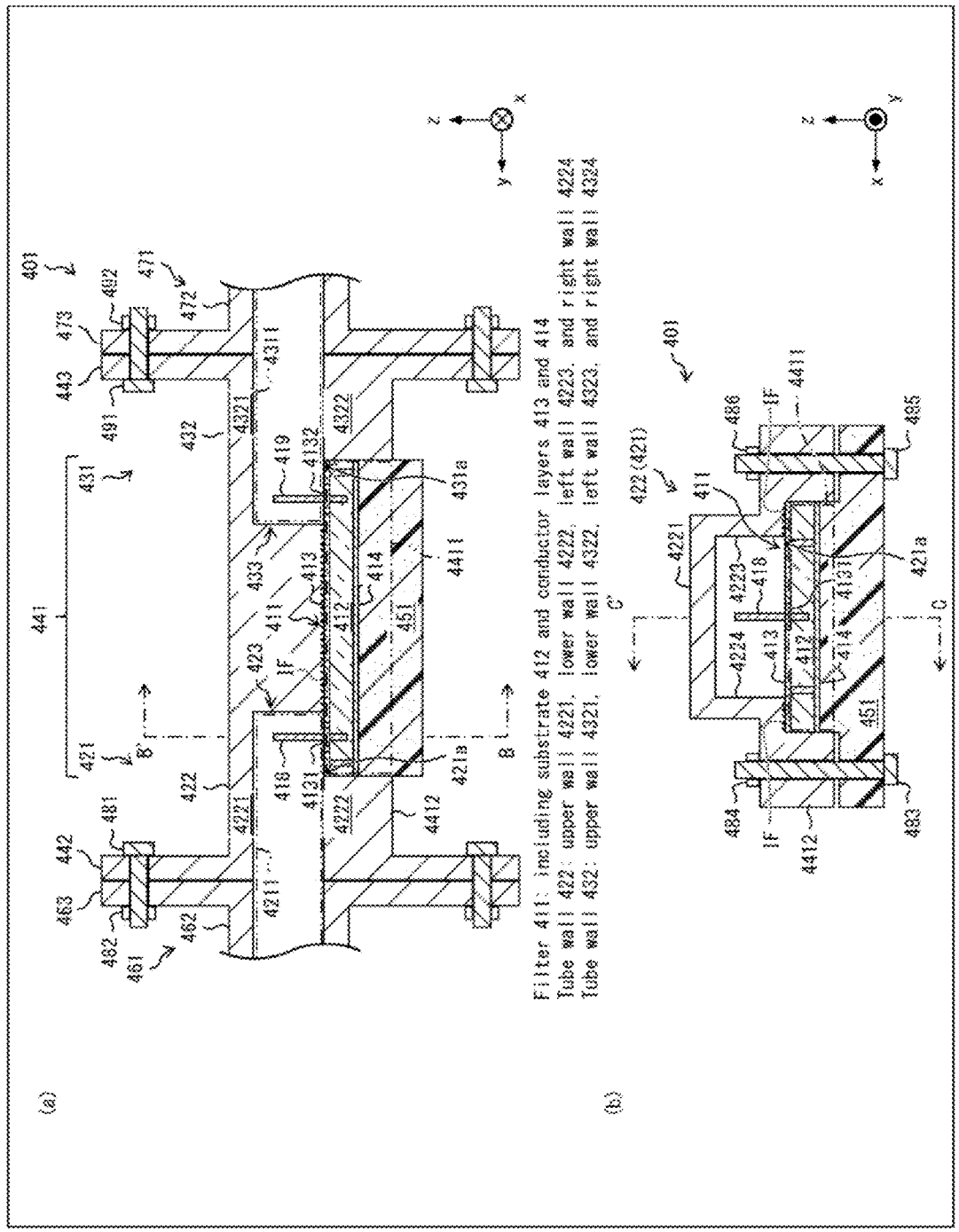

(a) and (b) of FIG. 5 are each a cross-sectional view illustrating a filter device in accordance with Embodiment 2 of the present invention.

Figure 6:
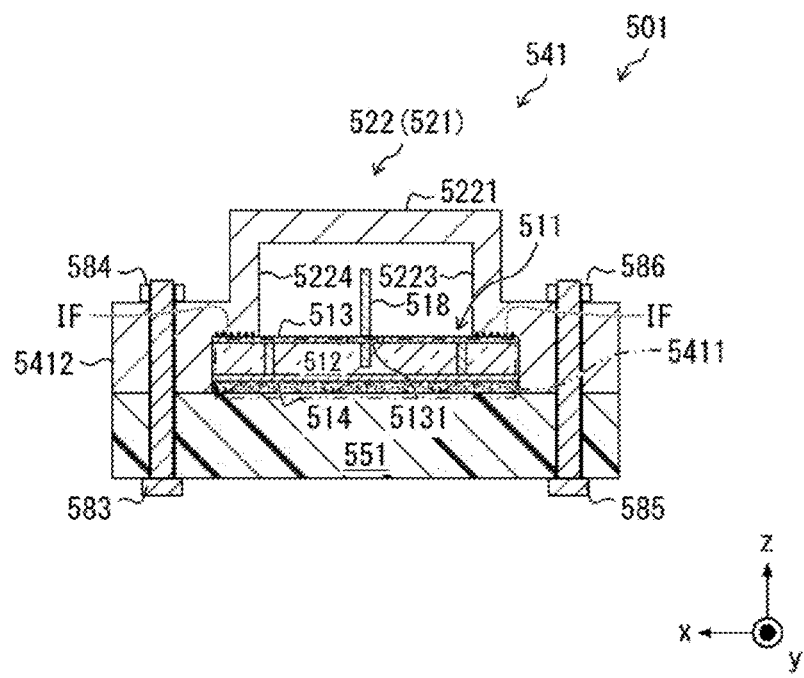

FIG. 6 is a cross-sectional view illustrating Variation 1 of the filter device illustrated in FIG. 5.

Figure 7:
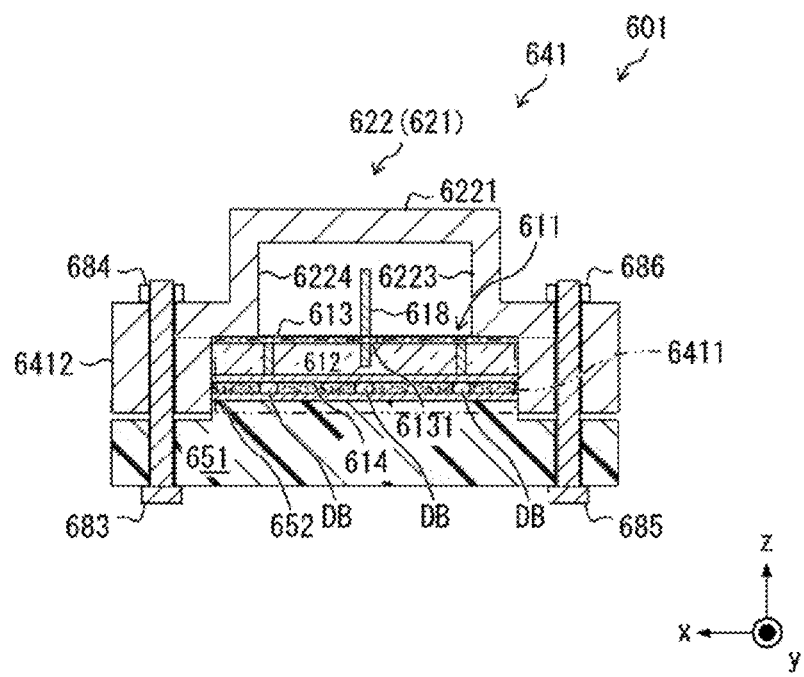

FIG. 7 is a cross-sectional view illustrating Variation 2 of the filter device illustrated in FIG. 5.

DESCRIPTION OF EMBODIMENTS

A filter device in accordance with an aspect of the present invention is a filter device obtained by coupling (i) a filter constituted by a post-wall waveguide (PWW) and (ii) two waveguide tubes (first waveguide tube and second waveguide tube). In the filter device in accordance with an aspect of the present invention, the filter is provided between the first waveguide tube and the second waveguide tube.

A filter device in accordance with an aspect of the present invention is designed to be operated in the E-band (band of not less than 70 GHz to not more than 90 GHz). Further, a filter device in accordance with an aspect of the present invention is designed to be operated in an external environment with a temperature of not less than −25° C. and not more than 100° C.

[Embodiment 1]

Figure 1:
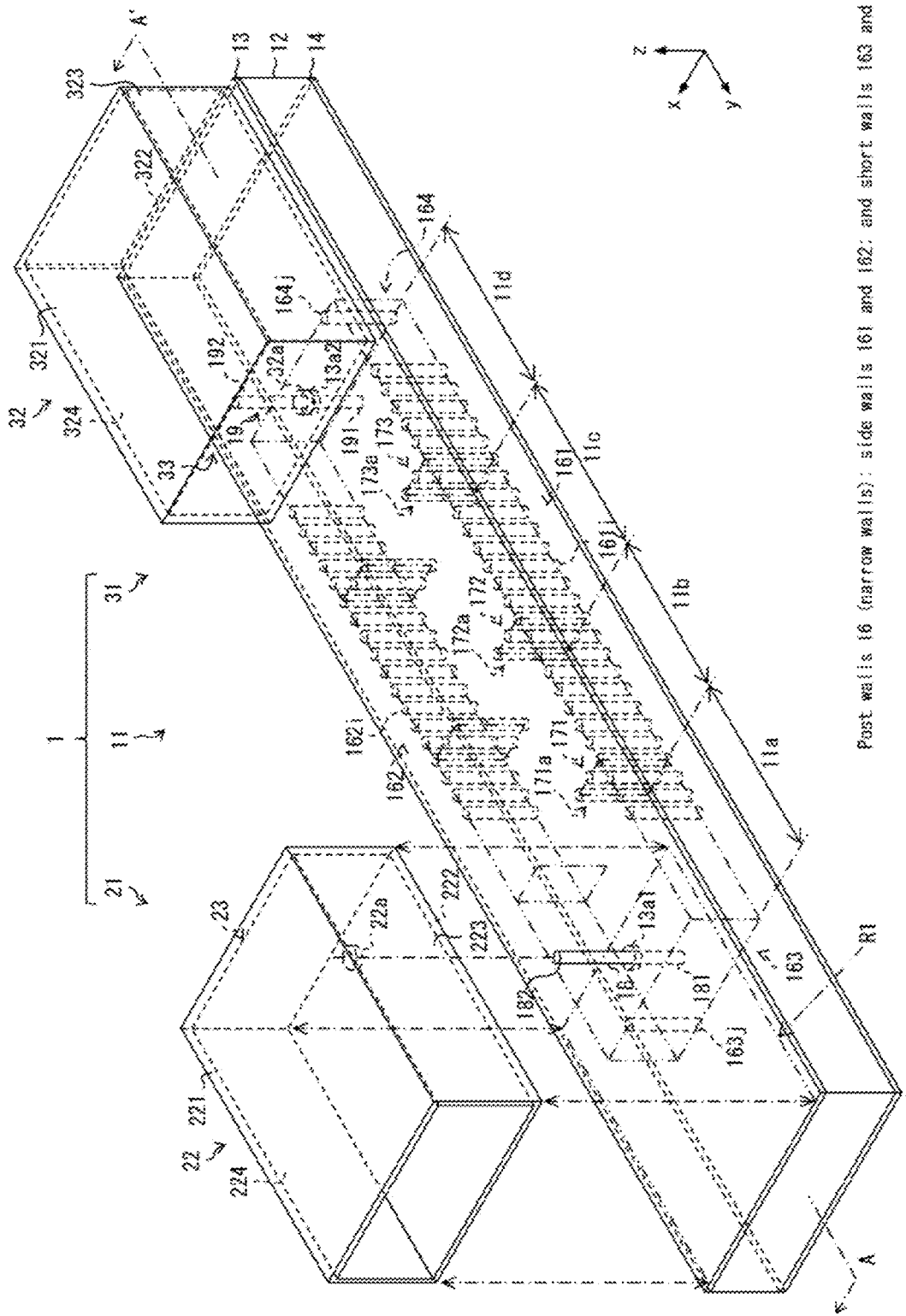
FIG. 1 is an exploded perspective view illustrating part of a filter device in accordance with Embodiment 1 of the present invention.

A filter device in accordance with Embodiment 1 of the present invention will be described with reference to FIGS. 1 and 2. FIG. 1 is an exploded perspective view illustrating a filter device 1 in accordance with Embodiment 1. FIG. 2 is a cross-sectional view illustrating a PWW-waveguide tube converting section included in the filter device 1.

In the filter device 1, a filter 11, a waveguide tube 21, and a waveguide tube 31 are placed such that directions of propagation of electromagnetic waves in the filter 11, the waveguide tube 21, and the waveguide tube 31 are in line with each other (preferably become parallel to each other). In orthogonal coordinate systems illustrated in FIGS. 1 and 2, a y-axis is set to the directions of propagation of electromagnetic waves in the filter 11, the waveguide tube 21, and the waveguide tube 31, a z-axis is set to a direction normal to a surface of a substrate 12, and an x-axis is set to a direction orthogonal to the y-axis and the z-axis.

Note that, in the present specification, in accordance with the orientation of the filter device 1 arranged as illustrated in FIG. 1, a z-axis positive (negative) direction is referred to as an upper (lower) direction, an x-axis positive (negative) direction is referred to as a left (right) direction, and a y-axis positive (negative) direction is referred to as an anterior (posterior) direction. Further, in a case where no specification of whether a positive direction or a negative direction is made, a z-axis direction is referred to as upper and lower directions, an x-axis direction is referred to as left and right directions, and a y-axis direction is referred to as anterior and posterior directions.

As illustrated in FIG. 1, the filter device 1 includes the filter 11 constituted by a PWW, the waveguide tube 21, and the waveguide tube 31. The waveguide tube 21 and the waveguide tube 31 are a first waveguide tube and a second waveguide tube, respectively, recited in the claims.

(Filter 11)

The filter 11 is a laminate substrate in which a conductor layer 13 and a conductor layer 14 are provided on opposite sides of a substrate 12 made of a dielectric (made of quartz glass in Embodiment 1). The conductor layer 13 and the conductor layer 14 are, respectively, a first conductor layer and a second conductor layer recited in the claims. Note that the substrate 12 need only be made of a dielectric, and the dielectric which constitutes the substrate 12 may be selected as appropriate in consideration of at least one of a relative dielectric constant, processability, and the like.

The filter 11 has a first region R1 provided in advance in the vicinity of an opening 13a1 (described later). In the first region R1, part of a tube wall of the waveguide tube 21 can be placed. Further, the filter 11 has a second region provided in advance in the vicinity of an opening 13a2 (described later). In the second region, part of a tube wall of the waveguide tube 31 can be placed. The opening 13a1 and the opening 13a2 are a first opening and a second opening recited in the claims.

Inside the substrate 12 are provided post walls obtained by arranging a plurality of conductor posts $161i$, $162i$, $163j$, and $164j$ (where i and j are any positive integers) in a fence-like manner (see FIG. 1).

The plurality of conductor posts $161i$, $162i$, $163j$, and $164j$ are obtained by charging a conductor such as a metal into vias, which are formed so as to pass through the substrate 12 from the front surface to the rear surface of the substrate 12, or by depositing the conductor on internal surfaces of the vias. All of the plurality of conductor posts $161i$, $162i$, $163j$, and $164j$ electrically connect the conductor layer 13 and the conductor layer 14. Note that a diameter of the conductor posts $161i$, $162i$, $163j$, and $164j$ may be set as appropriate according to the operation band. In Embodiment 1, the diameter of the conductor posts $161i$, $162i$, $163j$, and $164j$ is 100 μm. Further, an interval between adjacent ones of the conductor posts $161i$, an interval between adjacent ones of the conductor posts $162i$, an interval between adjacent ones of the conductor posts $163j$, and an interval between adjacent ones of the conductor posts $164j$ are each 100 μm, which is equal to the diameter of the conductor posts $161i$, $162i$, $163j$, and $164j$.

A side wall 161, which is a post wall obtained by arranging the plurality of conductor posts $161i$ at a predetermined spatial period in a fence-like manner, functions as a kind of conductor wall that reflects electromagnetic waves in a band corresponding to the spatial period.

Similarly, a post wall obtained by the plurality of conductor posts $162i$ constitutes a side wall 162, a post wall obtained by the plurality of conductor posts $163j$ constitutes a short wall 163, and a post wall obtained by the plurality of conductor posts $164j$ constitutes a short wall 164. Further, the side walls 161 and 162 and the short walls 163 and 164 are collectively referred to as narrow walls 16. Individual plane surfaces represented by imaginary lines (two-dot chain lines) illustrated in FIG. 1 are imaginary plane surfaces each including corresponding ones of central axes of the plurality of conductor posts $161i$, $162i$, $163j$, and $164j$, and are plane surfaces each schematically representing a conductor wall which is imaginarily realized by a corresponding one of the side walls 161 and 162 and the short walls 163 and 164.

Note that FIG. 1 omits some of the conductor posts $161i$, some of the conductor posts $162i$, some of the conductor posts $163j$, and some of the conductor posts $164j$, for ease of viewing of the configuration of the PWW-waveguide tube converting section (described later).

As illustrated in FIG. 1, the narrow walls 16 surround a rectangular parallelepiped-shaped region from the anterior and posterior directions and from the left and right directions. Further, the conductor layer 13 and the conductor layer 14, which are a pair of wide walls, surround the rectangular parallelepiped-shaped region from the upper and lower directions, respectively. Electromagnetic waves propagate through a propagation region, i.e. the rectangular parallelepiped-shaped region, in the y-axis direction of the propagation region. Thus, the PWW is constituted by a pair of wide walls and narrow walls.

In Embodiment 1, the above-described rectangular parallelepiped-shaped propagation region is divided into a resonator 11a, a resonator 11b, a resonator 11c, and a resonator 11d by partition walls 171, 172, and 173. Note that, as with the narrow walls 16, the partition walls 171, 172, and 173 are constituted by post walls.

Although the partition wall 171 is constituted by the conductor posts, no conductor posts are provided in and near a center of the partition wall 171. Thus, the conductor posts are not provided in some area of the post walls, and such an area functions as a coupling window 171a through which the resonator 11a and the resonator 11b, adjacent to each other, are electromagnet coupled.

Similarly, through a coupling window 172a provided in and near the center of the partition wall 172, the resonator 11b and the resonator 11c are coupled. Through a coupling window 173a provided in and near the center of the partition wall 173, the resonator 11c and the resonator 11d are coupled.

The filter 11 configured by electromagnetically coupling the resonators 11a to 11d in this manner is a resonator-coupled filter.

(Waveguide Tube 21)

The waveguide tube 21 is made of a conductor (in Embodiment 1, a brass surfaced with gold plating). As illustrated in FIG. 1, the waveguide tube 21 includes a tube wall 22, which is rectangular in cross section, and a short wall 23. The short wall 23 seals an end portion (end portion on a y-axis negative direction side) of the tube wall 22. That is, the waveguide tube 21 is a rectangular waveguide tube. The tube wall 22 has a wide wall 221 and a wide wall 222, which are a pair of wide walls, and a narrow wall 223 and a narrow wall 224, which are a pair of narrow walls.

Out of the pair of wide walls, the wide wall 222 located on a filter 11 side (on a z-axis negative direction side) has an opening 22a, which is larger in diameter than a pin 18 (described later).

To couple the filter 11 and the waveguide tube 21, the waveguide tube 21 is brought close to the filter 11 in the z-axis negative direction from a disassembled state illustrated in FIG. 1, and the waveguide tube 21 is placed on the filter 11 in such a manner that the pin 18 passes through the opening 22a, and a lower surface of the wide wall 222 comes into close contact with an upper surface of the conductor layer 13 without any gap between them.

In the filter device 1 configured as described above, the waveguide tube 21 is electromagnetically coupled to the filter 11 via the pin 18. Thus, the pin 18 is a PWW-waveguide tube converting section through which the filter 11, which is constituted by PWW, and the waveguide tube are coupled. The PWW-waveguide tube converting section will be described in detail later with reference to FIG. 2.

In Embodiment 1, an end portion (end portion on a y-axis positive direction side) of the waveguide tube 21 on a side facing away from the short wall 23 is trimmed off so as to be flush with an end face of the substrate 12 on the y-axis positive direction side. However, the end portion of the waveguide tube 21 on the y-axis positive direction side may further extend toward the y-axis positive direction side, without being trimmed off. Further, as described later with reference to FIG. 7, the end portion of the waveguide tube 21 on the y-axis positive direction side may be coupled to a device, such as an antenna, which is suitable to be coupled with use of a waveguide tube.

Note that, in Embodiment 1, the waveguide tube 21 is left hollow inside. Instead of having such a hollow structure, the waveguide tube 21 may be configured such that dielectric particles for adjusting a relative dielectric constant are charged into the waveguide tube 21.

(Waveguide Tube 31)

The waveguide tube 31 has the same configuration as that of the waveguide tube 21. That is, the waveguide tube 31 is constituted by a tube wall 32 and a short wall 33. The tube wall 32 has a wide wall 321 and a wide wall 322, which are a pair of wide walls, and a narrow wall 323 and a narrow wall 324, which are a pair of narrow walls. Further, the wide wall 322 has an opening 32a that is larger in diameter than a pin 19 (described later).

In the waveguide tube 21, the short wall 23 is placed on the filter 11 so as to be located on the y-axis negative direction side. In contrast, in the waveguide tube 31, the short wall 33 is placed on the filter 11 so as to face in the direction opposite to the direction in which the waveguide tube 21 faces, that is, so as to be located on the y-axis positive direction side.

The waveguide tube 31 is electromagnetically coupled to the filter 11 via the pin 19. Thus, as in the case of the pin 18, the pin 19 is a PWW-waveguide tube converting section. The PWW-waveguide tube converting section will be described in detail later with reference to FIG. 2.

(PWW-Waveguide Tube Converting Section)

The filter device 1 includes a first PWW-waveguide tube converting section, in which the filter 11 and the waveguide tube 21 are coupled to each other, and a second PWW-waveguide tube converting section, in which the filter 11 and the waveguide tube 31 are coupled to each other. The first PWW-waveguide tube converting section and the second PWW-waveguide tube converting section have the same configuration. Thus, in Embodiment 1, the PWW-waveguide tube converting section included in the filter device 1 will be described by taking the first PWW-waveguide tube converting section as an example.

A cross-sectional view of a cross section taken along line A-A' in FIG. 1 (a cross section along a y-z plane surface) is illustrated in FIG. 2. FIG. 2 is a cross-sectional view illustrating the vicinity of the pin 18.

As illustrated in FIG. 2, a portion of the conductor layer 13 is cut out in the shape of a ring in the vicinity of the conductor posts 163j (conductor posts constituting the short wall 163) in the propagation region of the filter 11. As a result, the conductor layer 13 is provided with an opening 13a1. Inside the opening 13a1 is provided a land 131 (not illustrated in FIG. 1) which is concentric with the opening 13a1. Further, a circular opening is provided in and near the center of the land 131 (preferably in the center of the land 131), and the substrate 12 has a cylindrical pore which communicates with the circular opening and extends from a surface of the substrate 12 (the surface on a z-axis positive direction side) to the inside of the substrate 12. As illustrated in FIG. 2, the pore is a non-through-hole.

The pin 18 (first columnar conductor recited in the claims) made of a metal is secured to the substrate 12 by being inserted into the opening and pore of the land 131 described above. The pin 18 being inserted into the substrate 12 in this way passes through the opening 13a1, and a lower end portion 181 of the pin 18 (one end portion recited in the claims) is located inside the substrate 12, i.e. in the propagation region of the filter 11. Further, an upper end portion 182 (another end portion recited in the claims) of the pin 18 being secured in this way is located inside the waveguide tube 21, i.e. in the propagation region of the waveguide tube 21.

The diameter of the pin 18, the length of the pin 18 (length along the z-axis direction), the length of a portion of the pin 18 inserted into the substrate 12, and the length of a portion of the pin 18 protruding through the surface of the substrate 12 can be used as design parameters for optimizing return loss. For example, in Embodiment 1, 180 μm is employed as the diameter of the pin 18.

Note that the end portion 182 of the pin 18 is not in electrical communication with the wide wall 221. The length of the portion of the pin 18 protruding through the substrate can be adjusted within the bounds of the end portion 182 not contacting the wide wall 221.

In a case where electromagnetic waves propagating through the propagation region of the filter 11 in the y-axis positive direction are present, the portion of the pin 18 inserted into the substrate 12 draws the electromagnetic waves which have propagated through the propagation region of the filter 11, and the portion of the pin 18 protruding through the substrate 12 radiates the electromagnetic waves into the propagation region of the waveguide tube 21. Similarly, in a case where electromagnetic waves propagating through the propagation region of the waveguide tube 21 in the y-axis negative direction are present, the portion of the pin 18 protruding through the substrate 12 draws the electromagnetic waves from the propagation region of the waveguide tube 21, and the portion of the pin 18 inserted into the substrate 12 radiates the electromagnetic waves into the propagation region of the filter 11. Thus, the pin 18 functions as the PWW-waveguide tube converting section.

As described above, the pin 18 electromagnetically couples a mode of propagating through the propagation region of the filter 11 and a mode of propagating through the propagation region of the waveguide tube 21. The coupling between the filter 11 and the waveguide tube 21 via the pin 18 is provided over a wide band, in comparison to coupling with use of the conventional coupling window. Thus, the filter device 1 including the pin 18 can reduce return loss at a coupling section between the filter 11 and the waveguide tube 21 over a wide band, in comparison to the conventional transmission device. Thus, the filter device 1 can broaden a band in which return loss is small, in comparison to the conventional transmission line.

Note that, as described earlier, the filter 11 illustrated in FIGS. 1 and 2 can be easily coupled to the waveguide tube 21 and the waveguide tube 31 with use of (i) the waveguide tube 21 having the tube wall 22 with the opening 22a and (ii) the waveguide tube 31 having the tube wall 32 with the opening 32a. Specifically, it is possible to couple the filter 11 and the waveguide tube 21 by passing the pin 18 through the opening 22a provided in the waveguide tube 21 and by placing the waveguide tube 21 such that the end portion 182 of the pin 18 is located inside the waveguide tube 21. The same applies to coupling of the filter 11 and the waveguide tube 31

A coupling section, provided in this way, between the filter 11 and the waveguide tube 21 can reduce return loss over a wide band. Similarly, a coupling section, provided in this way, between the filter 11 and the waveguide tube 31 can reduce return loss over a wide band. Thus, the filter 11 is also included in the technical scope of the present invention.

[Variation of Pin 18]

A pin 118, which is a variation of the pin 18, will be described with reference to FIG. 3. (a) of FIG. 3 is a cross-sectional view illustrating a filter device 1 including the pin 118. (b) of FIG. 3 is an enlarged cross-sectional view illustrating the pin 118. Note that, in Embodiment 1, a variation is described by taking the pin 118 as an example. However, as a matter of course, it is also possible to employ, as a variation of the pin 19, the structure of the pin 118 obtained by deforming the pin 18. In a case where the pin 118 is employed as the first PWW-waveguide tube converting section included in the filter device 1, it is preferable to employ a variation of the pin 19 as the second PWW-waveguide tube converting section.

In the filter device 1 illustrated in FIG. 3, the pin 18 included in the filter device 1 illustrated in FIGS. 1 and 2 is replaced by the pin 118, and the waveguide tube 21 included in the filter device 1 illustrated in FIGS. 1 and 2 is replaced by a waveguide tube 121. In the present variation, only different features of the filter device 1 illustrated in FIG. 3, as compared with the features of the filter device 1 illustrated in FIGS. 1 and 2, will be described.

The pin 118 is divided into a blind via 118a, which is a first part, and a blind via 118b, which is a second part.

The blind via 118a is configured as below. An opening 13a1 is provided in the vicinity of the conductor post 163j in the propagation region of the filter 11. Inside the opening 13a1, a land 131 is provided. Further, a cylindrical pore is provided in and near the center of the land 131 (preferably in the center of the land 131). The pore is a non-through-hole. The blind via 118a is obtained by charging a conductor such as a metal into the non-through-hole or by depositing the conductor on an internal surface of the non-through-hole. The blind via 118a has a lower end portion (one end portion recited in the claims) located inside the substrate 12, i.e. in the propagation region of the filter 11. Further, the blind via 118a has an upper end portion (another end portion recited in the claims) which is in electrical communication with the land 131.

The blind via 118b is embedded in a block 119 made of a dielectric (made of quartz glass in Embodiment 1), an upper end portion 118b1 (end portion on the z-axis positive direction side) is located inside the block 119, and a lower end portion 118b2 (end portion on the z-axis negative direction side) reaches the surface of the block 119.

The blind via 118b can be produced as follows: A substrate used as the block 119 is a substrate (i) having a thickness smaller than a distance between the wide walls 1221 and 1222 of the waveguide tube 121, (ii) being made of a dielectric (made of quartz glass in Embodiment 1), and (iii) having a conductor layer 120 formed on one surface (surface on the z-axis negative direction side in FIG. 3) of the substrate. A plurality of blind vias are formed in a matrix manner on the substrate having the conductor layer 120 formed thereon. Then, by cutting the substrate having the plurality of blind vias formed thereon into cubes, the block 119 having the blind via 118b formed thereon is obtained. Then, by cutting out a portion of the conductor layer 120 in a ring shape, (i) a land 1201 which is in electrical communication with the blind via 118b and (ii) the conductor layer 120 surrounding the land 1201 while being spaced away from the land 1201 are formed on the surface of the block 119.

As illustrated in (b) of FIG. 3, the land 1201 is connected to the land 131 with use of a bump B1. The conductor layer 120 is connected to the conductor layer 13 with use of bumps B2 and B3. The bumps B1 to B3, which are an aspect of an electrically conductive connecting member, are each obtained by forming a solder layer on a surface of a metallic spherical member. In this manner, the blind via 118b is connected and secured to the blind via 118a.

Here, to reduce return loss as much as possible, it is preferable that a central axis of the blind via 118a be coaxial (coincide) with a central axis of the blind via 118b.

The electrically conductive connecting member may be a solder, an electrically conductive adhesive (e.g., silver paste), or the like as an alternative to the bumps. However, by employing the bumps B1 to B3 having a uniform diameter as the electrically conductive connecting member, it is possible to easily enhance parallelism between the surface of the substrate 12 on which the conductor layer 13 is formed and the surface of the block 119 on which the conductor layer 120 is formed. Thus, it is easy to connect the blind via 118a and the blind via 118b in a state in which the central axis of the blind via 118a and the central axis of the blind via 118b are parallel to each other.

In the case of the pin 18, a cylindrical pore having a predetermined diameter (e.g., 180 μm) is provided in advance on the substrate 12 at a predetermined position, and the pin 18 is inserted into the pore so that the pin 18 is secured to the substrate 12. In this case, the diameter of the pore needs to be precisely formed. The predetermined diameter is defined with a certain margin (tolerance). However, in a case where the diameter of a provided pore is smaller than the predetermined diameter, the pin 18 cannot be inserted into the substrate. In a case where the diameter of a provided pore is larger than the predetermined diameter, the pin 18 cannot be firmly secured to the substrate.

Further, the pin 18, which is a very thin columnar conductor, tends to bend when inserted into the pore. Therefore, the operation of inserting the pin 18 into the substrate 12 need to be done with a high degree of precision, regardless of whether when a person carries out the operation by hand or when a manipulator controlled by a machine is used to carry out the operation.

On the contrary, in the case of the pin 118, the blind via 118a and the blind via 118b can be connected easily and accurately with use of the electrically conductive connecting member such as the bumps B1 to B3. Thus, the filter device 1 with the pin 118 can be easily produced in comparison with the filter device 1 with the pin 18.

Further, the configuration in which the blind via 118b, which is the second part, is embedded in the block 119 provides ease of handling in comparison with a configuration in which the second part is merely a columnar conductor (a configuration in which the blind via 118b is not embedded in the block 119). Thus, the filter device 1 with the pin 118 can be produced more easily.

With the pin 118 embedded in the block 119, a size of an opening 122a (see (a) of FIG. 3) provided on the wide wall 1222 of the waveguide tube 121 is larger than the opening 22a (see FIG. 2). Specifically, when the filter device 1 is viewed in a plan view, the size of the opening 122a is increased so as to encompass the block 119. With such a configuration, the waveguide tube 21 can be placed easily at a predetermined position even when the pin 118 is embedded in the block 119.

EXAMPLES

Example 1

As Example 1 of the present invention, reflection characteristics and transmission characteristics were calculated with use of the configuration of the PWW-waveguide tube converting section included in the filter device 1 illustrated in FIG. 2. In Example 1, the pin 18 is employed as the PWW-waveguide tube converting section. In Example 1, design parameters of the pin 18 were determined as follows:
Diameter: 180 μm
Length of the portion inserted into the substrate 12: 420 μm
Length of the portion protruding through the substrate 12: 700 μm Example 2

As Example 2 of the present invention, reflection characteristics and transmission characteristics were calculated with use of the configuration of the PWW-waveguide tube converting section included in the filter device 1 illustrated in FIG. 3. In Example 2, the pin 118 is employed as the PWW-waveguide tube converting section.
Blind via 118a
    Diameter: 100 μm
    Length: 420 μm
Blind via 118b
    Diameter: 100 μm
    Length: 700 μm
Bumps B1 to B3
    Diameter: 100 μm
    (Common Design Parameters)
    Note that the design parameters common to both Example 1 and Example 2 were determined as follows:
Filter 11
    Thickness of the substrate 12: 520 μm
    Dielectric constant of the substrate 12: 3.89
Waveguide tube 21
    Distance between the wide wall 221 and the wide wall 222: 1149 μm
    Distance between the narrow wall 223 and the narrow wall 224: 2500 μm.
(Reflection Characteristics and Transmission Characteristics)

(a) of FIG. 4 is a graph showing reflection characteristics (frequency dependence of S11) and transmission characteristics (frequency dependence of A21) in Example 1. (b) of FIG. 4 is a graph showing reflection characteristics (frequency dependence of S11) and transmission characteristics (frequency dependence of S parameter S21) in Example 2. In both (a) of FIG. 4 and (b) of FIG. 4, the symbol "S11" is given to a plot of the reflection characteristic, and the symbol "S21" is given to a plot of the transmission characteristics.

Referring to (a) of FIG. 4, the reflection characteristics, S11, in Example 1 is not more than −15 dB in a band of approximately not less than 71 GHz to not more than 88 GHz.

Referring to (b) of FIG. 4, the reflection characteristics, S11, in Example 2 is not more than −15 dB in a band of approximately not less than 73 GHz to not more than 90 GHz.

As described above, the transmission lines in Examples 1 and 2 achieved reduction of return loss over a wide band, in comparison to the transmission line provided with the conventional PWW-waveguide tube converting section with use of a coupling window.

Further, both Example 1 and Example 2, with return loss reduced over a wide band, exhibit favorable transmission characteristics over a wide band.

The second PWW-waveguide tube converting section has the same configuration as that of the first PWW-waveguide tube converting section. Thus, the second PWW-waveguide tube converting section shows the same results as those shown in the Examples described above.

[Embodiment 2]

A filter device in accordance with Embodiment 2 of the present invention will be described with reference to FIG. 5. (a) and (b) of FIG. 5 are each a cross-sectional view illustrating a filter device 401 in accordance with Embodiment 2. (a) of FIG. 5 illustrates a cross-sectional view taking along a plane surface (y-z plane surface) that (i) includes a central axis of a pin 418, which is a columnar conductor constituting the PWW-waveguide tube converting section, and (ii) extends along a direction (y-axis direction) of propagation of electromagnetic waves. (b) of FIG. 5 illustrates cross-sectional view taken along a plane surface (z-x plane surface) that (i) includes the central axis of the pin 418 and (ii) intersects the direction (y-axis direction) of propagation of electromagnetic waves.

As illustrated in FIG. 5, the filter device 401 includes a filter 411, a housing 441, and a resin substrate 451.

(Filter 411)

The filter 411 has the same configuration as that of the filter 11 illustrated in FIGS. 1 and 2. Corresponding constituent members of the filter 411 have reference symbols which are obtained by putting "4" in front of reference symbols of the constituent members of the filter 11. In Embodiment 2, descriptions of those constituent members will be omitted.

(Housing 441)

The housing 441 illustrated in FIG. 5 is made by forming, in a rectangular parallelepiped-shaped metal block, tubular spaces 4211 and 4311 rectangular in cross section and a recess 4411 for accommodating the filter 411. The tubular space 4211 and the tubular space 4311 correspond to the first tubular space and the second tubular space recited in the claims, respectively.

In FIG. 5, the housing 441 is placed on a resin substrate 451 (described later) such that a lengthwise direction of the metal block coincides with a y-axis direction of an orthogonal coordinate system illustrated in FIG. 5, and a height direction of the metal block coincides with a z-axis direction of the orthogonal coordinate system illustrated in FIG. 5.

Out of six side wall surfaces constituting the metal block, a z-x plane surface on a y-axis positive direction side has the rectangular parallelepiped-shaped tubular space 4211 which is dug in the y-axis negative direction. Further, out of the six side wall surfaces constituting the metal block, a z-x plane surface on a y-axis negative direction side has the rectangular parallelepiped-shaped tubular space 4311 which is dug in the y-axis positive direction. These tubular spaces 4211 and 4311 function as waveguide tubes 421 and 431 that guide electromagnetic waves in the y-axis direction, respectively, in the same manner as the waveguide tubes 21 and 31 illustrated in FIGS. 1 and 2.

In other words, as illustrated in (a) and (b) of FIG. 5, an upper wall 4221, a lower wall 4222, a right wall 4223, and a left wall 4224, all of which surround the sides of the tubular space 4211, constitute a tube wall 422 of the waveguide tube 421. Out of the walls defining the tubular space 4211, the wall along the z-x plane surface constitutes a short wall 423 of the waveguide tube 421. Thus, the upper wall 4221 and the lower wall 4222 form a wide wall of the waveguide tube 421. The right wall 4223, the left wall 4224, and the short wall 423 form a narrow wall of the waveguide tube 421.

The tubular space 4311 is constituted in the same manner as the tubular space 4211 and is defined by a tube wall 432 and a short wall 433. The tube wall 432 is constituted by an upper wall 4321 and a lower wall 4322, which are a pair of wide walls, and a right wall 4323 and a left wall 4324, which are a pair of narrow walls. In the state illustrated in (a) of FIG. 5, the tubular space 4311 is provided so as to be mirror symmetric to the tubular space 4211 about a symmetry axis (axis parallel to a z-axis). A distance between the short wall 423 and the short wall 433 is set according to a distance between the pin 418 and the pin 419. Then, the tubular space 4311 is provided such that the above-described symmetry axis coincides with an imaginary line which is a set of points equidistant from the pin 418 and the pin 419.

Out of six side wall surfaces constituting the metal block, an x-y plane surface on a z-axis negative direction side has the rectangular parallelepiped-shaped recess 4411 which is dug in the z-axis positive direction. The shape of an opening of the recess 4411 corresponds to the shape of the substrate 412 of the filter 411. To allow the recess 4411 to accommodate the filter 411, the filter 411 is pushed into the recess 4411 through the opening of the recess 4411 in the z-axis positive direction. Note that the recess 4411 is provided at a position so as to be mirror symmetric about a symmetry axis (axis parallel to the z-axis). The symmetry axis about which the recess 4411 is mirror symmetric coincides with the symmetry axis about which the tubular space 4211 and the tubular space 4311 are mirror symmetric.

Note that a rim of the housing 441 around the recess 4411 is referred to as a skirt 4412. To reliably accommodate the filter 411, the depth of the recess 4411, i.e. the height of the skirt 4412, is set to be greater than the thickness of the filter 411 (total thickness of the substrate 412, the conductor layer 413, and the conductor layer 414).

As illustrated in (a) and (b) of FIG. 5, an opening 421a is provided at a boundary between a region of the tubular space 4211 on the y-axis negative direction side of the lower wall 4222, which is one of the members defining the tubular space 4211, and a region of the bottom surface of the recess 4411 on the y-axis positive direction side. The tubular space 4211 and the recess 4411 communicate with each other via the opening 421a.

Similarly, an opening 431a is provided at the boundary between the tubular space 4311 and the recess 4411. The tubular space 4311 and the recess 4411 communicate with each other via the opening 431a.

The filter 411 is placed inside the recess 4411 such that (1) an end portion of the pin 418, which is the first PWW-waveguide tube converting section, on the z-axis positive direction side is located inside the tubular space 4211, and the conductor layer 413 seals the opening 421a and such that (2) an end portion of the pin 419, which is the second PWW-waveguide tube converting section, on the z-axis positive direction side is located inside the tubular space 4311, and the conductor layer 413 seals the opening 431a. Thus, in the region in which the opening 421a is provided, a portion of the conductor layer 413 that seals the opening 421a functions as a portion of the lower wall 4222 of the waveguide tube 421. Further, in the region in which the opening 431a is provided, a portion of the conductor layer 413 that seals the opening 431a functions as a portion of the lower wall 4322 of the waveguide tube 431.

According to this configuration, the pin 418 can electromagnetically couple a mode of propagating through the waveguide tube 421 and a mode of propagating through the filter 411. Since the opening 421a is sealed by the conductor layer 413, loss does not increase. Similarly, the pin 419 can electromagnetically couple a mode of propagating through the waveguide tube 431 and a mode of propagating through the filter 411. Since the opening 431a is sealed by the conductor layer 413, loss does not increase.

Further, the housing 441 is configured such that the whole of the filter 411 is accommodated inside the recess 4411. Therefore, the housing 441 can reliably protect the filter 411 (in particular, substrate 412) against an external impact.

Note that as illustrated in FIG. 5, the waveguide tube 421 may be coupled to another waveguide tube, i.e. a waveguide tube 461, on an open end side of the waveguide tube 421. The waveguide tube 431 may be coupled to another waveguide tube, i.e. a waveguide tube 471, on an open end side of the waveguide tube 431. In Embodiment 2, a flange 442 is provided on the open end side of the waveguide tube 421. Further, a flange 463 is provided at the end portion of the waveguide tube 461 on the waveguide tube 421 side. The flange 442 and the flange 463 are secured with use of a bolt 481 and a nut 482, so that the waveguide tube 421 and the waveguide tube 461 are coupled to each other. The same applies to a flange 443, which is provided on an open end side of the waveguide tube 431, and a flange 473, which is included in the waveguide tube 471.

(Resin Substrate 451)

The resin substrate 451 is configured such that the resin substrate 451 is capable of holding the filter 411 in a state in which the filter 411 is sandwiched between the resin substrate 451 and the housing 441. As illustrated in (b) of FIG. 5, the housing 441 and the resin substrate 451 are secured with use of bolts 483 and 485 and nuts 484 and 486. A combination of the bolt 483 and the nut 484 and a combination of the bolt 485 and the nut 486 are each an aspect of a pressure applying member recited in the claims. The pressure applying member is not limited to a combination of a bolt and a nut.

The resin substrate 451 is made of resin (made of glass epoxy resin in Embodiment 2). A resin material constituting the resin substrate 451 can be selected as appropriate in view of thermal expansion properties, processability, and the like.

On a surface of the resin substrate 451 on a side facing the filter 411 (on the z-axis positive direction side), is provided a protrusion in a shape corresponding to the recess 4411 (in a shape corresponding to a skirt 4412). This protrusion pushes the filter 411 toward the housing 441 (to the z-axis positive direction side).

At this time, the height of the skirt 4412 of the housing 441 is so set that the skirt 4412 and the resin substrate 451 are spaced away from each other.

According to the above configuration, the protrusion of the resin substrate 451 pushes the conductor layer 414 of the filter 411 in the z-axis positive direction. As a result, the conductor layer 413 of the filter 411 is pushed onto the bottom surface of the recess 4411 of the housing 441. That is, the surface of the conductor layer 413 and the bottom surface of the recess 4411 are in close contact with each other, and thus prevent generation of an air gap in an interface IF.

Thus, the housing 441 and the resin substrate 451 are secured in a state in which the surface of the conductor layer 413 and the bottom surface of the recess 4411 are in close contact with each other without any gap between them.

With the above configuration, the filter 411 is sandwiched between the housing 441 and the resin substrate 451. This prevents the filter 411 from being displaced inside the recess 4411. In this way, the filter 411 and the waveguide tube 421 can be reliably held in proper positions in relation to each other, and the filter 411 and the waveguide tube 431 can be reliably held in proper positions in relation to each other. Thus, it is possible to prevent fluctuation of return loss that can occur at a coupling section between the filter 411 and the waveguide tube 421 and at a coupling section between the filter 411 and the waveguide tube 431. Thus, the filter device 401 can reliably broaden a band in which return loss is small, in comparison to the conventional transmission line.

Further, since it is possible to prevent generation of an air gap in the interface IF, it is possible to prevent electromagnetic waves propagating through the waveguide tube 421 and electromagnetic waves propagating through the waveguide tube 431 from entering the interface IF. Thus, it is possible to further reduce loss that can occur at the coupling section between the filter 411 and the waveguide tube 421 and at the coupling section between the filter 411 and the waveguide tube 431.

Further, according to the above configuration, the waveguide tube 421 is integrally molded with the housing 441, and the filter 411 is firmly secured to the recess 4411 of the housing 441. Thus, the filter device 401 allows the waveguide tube 421 and the waveguide tube 431 to be firmly coupled to the filter 411.

[Variation 1]

A filter device 501, which is Variation 1 of the filter device 401, will be described with reference to FIG. 6. Corresponding constituent members of the filter device 501 in common with the filter device 401 have reference symbols which are obtained by replacing the initial number "4" of reference symbols for the filter device 401 (see FIG. 5) by "5". In the present variation, only different features of the filter device 501, as compared with the features of the filter device 401, will be described, and the other features will be omitted.

As illustrated in FIG. 6, a resin substrate 551 included in the filter device 501 has no protrusion provided thereon, although the resin substrate 451 has the protrusion provided thereon. That is, a surface of the resin substrate 551 on the side facing the housing 541 is constituted by a flat surface.

A skirt 5412 is configured such that the height of the skirt 5419 is greater than the thickness of the filter 511 (total thickness of a substrate 512, a conductor layer 513, and a conductor layer 514). This allows the conductor layer 514 and the resin substrate 551 to be spaced away from each other. That is, the conductor layer 514 and the resin substrate 551 have an air gap between them. In this way, the filter device 501 has an air gap between the conductor layer 514 and the resin substrate 551. Thus, in an area where the air gap is present, a protrusion (protrusion of the resin substrate 451) may be provided on the surface of the resin substrate 551 on a side facing the housing 541

In the present embodiment, a resin material is filled in the air gap. Examples of the resin material include an adhesive, a resin mold, and the like. These resin materials are viscous fluids when filled, and then cures into a solid after a lapse of a predetermined time period.

For example, assume that a resin material in an amount exceeding the volume of the above-described air gap is filled in the air gap. In this case, the resin material thus filled is raised above the air gap by surface tension. In this state, the curing reaction of the resin material is proceeded. Then, at a point in time when the resin material becomes semi-cured, the resin substrate 551 is secured to the housing 541. According to this configuration, the resin material having a volume which exceeds the volume of the air gap causes a pressure for pushing the filter 511 toward the housing 541 (to the z-axis positive direction). Thus, according to this configuration, it is possible to prevent generation of an air gap in an interface IF between the surface of the conductor layer 513 and the bottom surface of the recess 5411, with use of a simple configuration.

[Variation 2]

A filter device 601, which is Variation 2 of the filter device 401, will be described with reference to FIG. 7. Corresponding constituent members of the filter device 601 in common with the filter device 401 have reference symbols which are obtained by replacing the initial number "4" of reference symbols for the filter device 401 (see FIG. 5) by "6". In the present variation, only different features of the filter device 601, as compared with the features of the filter device 401, will be described, and the other features will be omitted.

As illustrated in FIG. 7, a resin substrate 651 included in the filter device 601 has a protrusion which is provided on the resin substrate 451. On the surface of the protrusion, a conductor layer 652 is provided.

A skirt 6412 is configured such that the height of the skirt 6412 is less than a sum of (a) the thickness of a filter 611 (total thickness of a substrate 612, a conductor layer 613, and a conductor layer 614), (b) the height of the resin substrate 651, and (c) the thickness of the conductor layer 652. This allows the skirt 6412 and the resin substrate 651 to be spaced away from each other. That is, the skirt 6412 and the resin substrate 651 have an air gap between them. Thus, as long as the skirt 6412 and the resin substrate 651 have the air gap between them, the surface of the resin substrate 651 on a side facing the housing 641 may be flat.

Besides, the conductor layer 614 of the filter 611 is connected to the conductor layer 652 by use of a plurality of bumps DB. The bumps DB are an aspect of the connecting members recited in the claims, each of the bumps DB connects the conductor layer 652 and the conductor layer 614 with each other in its dot-like narrow region.

In this way, the filter 611 and the resin substrate 651 may be connected to each other by use of a plurality of connecting members. According to such a configuration, it is possible to firmly secure the filter 611 to the resin substrate 651.

Aspects of the present invention can also be expressed as follows:

A filter device (1, 401, 501, 601) in accordance with an embodiment of the present invention is a filter device (1, 401, 501, 601), including: a filter (11, 411, 511, 611) including a substrate (12, 412, 512, 612) made of a dielectric, a pair of wide walls being constituted by a first conductor layer (13, 413, 513, 613) and a second conductor layer (14, 414, 514, 614), respectively, and covering respective opposite surfaces of the substrate (12, 412, 512, 612), and narrow walls being constituted by post walls which are provided inside the substrate (12, 412, 512, 612); and a first waveguide tube (21, 121, 421, 521, 621) and a second waveguide tube (31, 431) each including a tube wall (22, 32, 122, 422, 432, 522, 622) made of a conductor and being placed along the substrate (12, 412, 512, 612).

The filter (11, 411, 511, 611) further includes: a first columnar conductor (18, 118, 418, 518, 618) passing through a first opening (13a1) which is provided in the first conductor layer (13, 413, 513, 613), the first columnar conductor (18, 118, 418, 518, 618) having one end portion (181, 118a1) located inside the substrate (12, 412, 512, 612); and a second columnar conductor (19, 419) passing through a second opening (13a2) which is provided in the first conductor layer (13, 413, 513, 613) or the second conductor layer (14, 414, 514, 614), the second columnar conductor (19, 419) having one end portion (191) located inside the substrate (12, 412, 512, 619).

The first waveguide tube (21, 121, 421, 521, 621) is placed such that the first columnar conductor (18, 118, 418, 518, 618) passes through an opening (22a, 122a) which is provided in the tube wall (22, 122, 422, 522, 622) of the first waveguide tube (21, 121, 421, 521, 621) and such that another end portion (182, 118b1) of the first columnar conductor (18, 118, 418, 518, 618) is located inside the first waveguide tube (21, 121, 421, 521, 621), and the second waveguide tube (31, 431) is placed such that the second columnar conductor (19, 419) passes through an opening (32a) which is provided in the tube wall (32, 432) of the second waveguide tube (31, 431) and such that another end portion (192) of the second columnar conductor (19, 419) is located inside the second waveguide tube (31, 431).

According to the above configuration, the filter and the first waveguide tube are electromagnetically coupled to each other via the first columnar conductor passing through the first opening which is provided in the first conductor layer. Similarly, the filter and the second waveguide tube are electromagnetically coupled to each other via the second columnar conductor passing through the second opening which is provided in the first conductor layer or the second conductor layer.

The first columnar conductor and the second columnar conductor can reduce return loss at a coupling section between the filter and the waveguide tube over a wide band, in comparison to a coupling window which couples a filter and a waveguide tube in the conventional transmission device. Thus, the filter device in accordance with an embodiment of the present invention can broaden a band in which return loss is small, in comparison to a case where a filter and a waveguide tube are coupled to each other with use of the conventional transmission line.

Further, a filter device (1, 401, 501, 601) in accordance with an embodiment of the present invention is preferably configured such that the filter (11, 411, 511, 611) further includes one or more partition walls (171, 172, 173) being constituted by post walls provided inside the substrate (12, 412, 512, 612) and dividing a region surrounded by the pair of wide walls (13, 14, 413, 414, 513, 514, 613, 614) and the narrow walls into a plurality of resonators (11a to 11d), the one or more partition walls (171, 172, 173) having respective coupling windows (171a, 172a, 173a).

Further, a filter device (1) in accordance with an embodiment of the present invention is preferably configured such that the first columnar conductor (118) and the second columnar conductor are each divided into a first part (118a) and a second part (118b), the first part (118a) being embedded in the substrate (12) and having one end portion (118a2) which reaches a surface of the substrate (12), the second part (118b) protruding through the substrate (12), and the first part (118a) and the second part (118b) are connected to each other by an electrically conductive connecting member (B1).

Each of the columnar conductors of the transmission line in accordance with an embodiment of the present invention is divided into the first part and the second part, as described above. The first part, which is embedded in the substrate and has one end portion exposed to the surface of the substrate, can be formed by a method similar to a method of forming the post wall. Then, by connecting the second part to the first part with use of the electrically conductive connecting member, each of the columnar conductors is formed.

A transmission line in accordance with an embodiment of the present invention can be produced by such a production method. Thus, the transmission line in accordance with an embodiment of the present invention can be produced easily, in comparison with a transmission line including a columnar conductor which is constituted by a single member.

Further, a filter device (1) in accordance with an embodiment of the present invention is preferably configured such that the second part (118*b*) of each of the first columnar conductor (118) and the second columnar conductor is embedded in a block (119) made of a dielectric, and an end portion (118*b*2) of the second part on a side facing the first part (118*a*) reaches a surface of the block (119).

The above configuration allows the second part to be easily handled in connecting the second part to the first part. Thus, the transmission line in accordance with an embodiment of the present invention can be produced more easily, in comparison with a transmission line in which the second part is not embedded in the block.

Further, a filter device (401, 501, 601) in accordance with an embodiment of the present invention further includes: a housing (441, 541, 641) made of a metal, the housing including a first tubular space (4211), a second tubular space (4311), and a recess (4411, 5411, 6411), the first tubular space (4211) functioning as a propagation region of the first waveguide tube (421, 521, 621), the second tubular space (4311) functioning as a propagation region of the second waveguide tube (431), the recess (4411, 5411, 6411) accommodating the filter (411, 511, 611); and a resin substrate (451, 551, 651) holding the filter (411, 511, 611) in a state in which the filter (411, 511, 611) is sandwiched between the resin substrate (451, 551, 651) and the housing (441, 541, 641).

In the filter (411, 511, 611), the second opening provided in the first conductor layer (413, 513, 613) or the second conductor layer (414, 514, 614) is provided in the first conductor layer (413, 513, 613).

The recess (4411, 5411, 6411) and the first tubular space (4211) communicate with each other via a first opening which is provided at a boundary between the recess (4411, 5411, 6411) and the first tubular space (4211), and the recess (4411, 5411, 6411) and the second tubular space (4311) communicate with each other via a second opening which is provided at a boundary between the recess (4411, 5411, 6411) and the second tubular space (4311).

The filter (411, 511, 611) is preferably placed such that the another end portion of the first columnar conductor (418, 518, 618) and the another end portion of the second columnar conductor (419) are located inside the first tubular space (4211) and the second tubular space (4311), respectively, and such that the first conductor layer (413, 513, 613) seals the first opening and the second opening which are provided at the boundaries.

According the above configuration, the filter is sandwiched with use of the housing and the resin substrate. Thus, the filter and the waveguide tube can be reliably held in positions in relation to each other. Thus, it is possible to prevent fluctuation of return loss that can occur at a coupling section between the filter and the waveguide tube. Thus, the filter device in accordance with an embodiment of the present invention can reliably broaden a band in which return loss is small, in comparison to a case where a filter and a waveguide tube are coupled to each other with use of the conventional transmission line.

Further, a filter device (401, 601) in accordance with an embodiment of the present invention further includes a pressure applying member (483, 484, 485, 486, 683, 684, 685, 686) which applies pressure to a skirt (4412, 6412), which is a rim of the housing (441, 641) around the recess (4411, 6411), and to the resin substrate (451, 651) in such a direction that the filter (411, 611) is sandwiched between the skirt (4412, 6412) and the resin substrate (451, 651).

It is preferable that a height of the skirt (4412, 6412) is so set that the skirt (4412, 6412) and the resin substrate (451, 651) are spaced away from each other.

According the above configuration, in connecting the resin substrate and the housing to each other, pressure is applied to the resin substrate and the housing in such a direction that the filter is sandwiched between the resin substrate and the housing. By so setting the height of the skirt that the skirt and the resin substrate are spaced away from each other, the filter is pushed in such a direction that the filter approaches the housing. Thus, it is possible to prevent generation of an air gap in between the first conductor layer of the filter and the recess of the housing.

Further, a filter device (501) in accordance with an embodiment of the present invention further includes a pressure applying member (583, 584, 585, 586) which applies pressure to a skirt (5412), which is a rim of the housing (541) around the recess (5411), and to the resin substrate (551) in such a direction that the filter (511) is sandwiched between the skirt (5412) and the resin substrate (551).

It is preferable that a height of the skirt (5412) is so set that the second conductor layer (514) of the filter (511) and the resin substrate (551) are spaced away from each other, and a resin material is filled in an air gap between the second conductor layer (514) and the resin substrate (551).

By filling the resin substrate in the air gap between the second conductor layer of the filter and the resin substrate, the resin material pushes the filter in such a direction that the filter approaches the housing. Thus, it is possible to prevent generation of an air gap in between the first conductor layer of the filter and the recess of the housing.

Further, a filter device (601) in accordance with an embodiment of the present invention further includes a pressure applying member (683, 684, 685, 686) which applies pressure to a skirt (6412), which is a rim of the housing (641) around the recess (6411), and to the resin substrate (651) in such a direction that the filter (611) is sandwiched between the skirt (6412) and the resin substrate (651).

It is preferable that a height of the skirt (6412) is so set that the second conductor layer (614) of the filter (611) and the resin substrate (651) are spaced away from each other, and the second conductor layer (614) is connected to the resin substrate (651) by a plurality of connecting members DB).

In this way, the filter and the resin substrate may be connected to each other by a plurality of connecting members. According to such a configuration, it is possible to firmly secure the filter to the resin substrate.

A filter (11, 411, 511, 611) in accordance with an embodiment of the present invention is a filter including: a substrate (12, 412, 512, 612) made of a dielectric; a pair of wide walls (13, 14, 413, 414, 513, 514, 613, 614) being constituted by a first conductor layer (13, 413, 513, 613) and a second conductor layer (14, 414, 514, 614), respectively, and covering respective opposite surfaces of the substrate (12, 412, 512, 612) and narrow all being constituted by post walls which are provided inside the substrate (12, 412, 512, 612), the filter (11, 411, 511, 611) further including: a first columnar conductor (18, 118, 418, 518, 618) passing through a first opening (13*a*1) which is provided in the first conductor layer (13, 413, 513, 613), the first columnar conductor (18, 118, 418, 518, 618) having one end portion (181, 118*a*1) located inside the substrate (12, 412, 512, 612); and a second columnar conductor (19, 419) passing through a second opening (13*a*2) which is provided in the first conductor layer (13, 413, 513, 613) or the second conductor layer (14, 414,

514, 614), the second columnar conductor (19, 419) having one end portion (191) located inside the substrate (12, 412, 512, 612).

According to the above configuration, with use of the first waveguide tube and the second waveguide tube each having the tube wall provided with the opening, it is possible to easily couple the filter and these waveguide tubes to each other. Specifically, it is possible to easily couple the filter and the first and second waveguide tubes to each other by (1) placing the first waveguide tube such that the first columnar conductor passes through the first opening which is provided in the tube wall of the first waveguide tube and such that another end portion of the first columnar conductor is located inside the first waveguide tube and by (2) placing the second waveguide tube such that the second columnar conductor passes through the second opening which is provided in the tube wall of the second waveguide tube and such that another end portion of the second columnar conductor is located inside the second waveguide tube.

The coupling sections, provided in this way, between the filter and the waveguide tubes can reduce return loss over a wide bandwidth, as in the case of the filter device in accordance with an embodiment of the present invention.

Further, a filter (11, 411, 511, 611) in accordance with an embodiment of the present invention is preferably configured such that the first conductor layer (13, 413, 513, 613) has a first region (R1) provided in advance in a vicinity of the first opening (13a1), the first region (R1) allowing part of the tube wall (22, 122, 422, 522, 622) of the first waveguide tube (21, 121, 421, 521, 621) to be placed in the first region (R1), and the first conductor layer (13, 413, 513, 613) or the second conductor layer (14, 414, 514, 614) has a second region provided in advance in a vicinity of the second opening (13a2), the second region allowing part of the tube wall (32, 432) of the second waveguide tube (31, 431) to be placed in the second region.

Further, it is preferable that a filter (11, 411, 511, 611) in accordance with an embodiment of the present invention further includes one or more partition walls (171, 172, 173) being constituted by post walls provided inside the substrate (12, 412, 512, 612) and dividing a region surrounded by the pair of wide walls (13, 14, 413, 414, 513, 514, 613, 614) and the narrow walls into a plurality of resonators (11a to 11d), the one or more partition walls (171, 172, 173) having respective coupling windows (171a, 172a, 173a).

Note that in the above section starting with "Aspects of the present invention can also be expressed as follows:", only members whose reference symbols are indicated in FIGS. 1 to 7 out of the members corresponding to the constituent components recited in the claims, are followed by their reference symbols in parentheses.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 401, 501, 601: Filter device
11, 411, 511, 611: Filter
12, 412, 512, 612: Substrate
13, 413, 513, 613: Conductor layer (first conductor layer, wide wall)
14, 414, 514, 614: Conductor layer (second conductor layer, wide wall)
16: Narrow wall
161, 162: Side wall
161i, 162i: Conductor post
163, 164: Short wall
171, 172, 173: Partition wall
171a, 172a, 173a: Coupling window
18, 19, 118, 418, 419, 518, 618: Pin (columnar conductor)
181, 182, 191, 192, 118a1, 118b1: End portion of the pin
118a, 118b: Blind via
119: Block
120: Conductor layer
1201: Land
B1, B2, B3: Bump
21, 31, 421, 431, 521, 621: Waveguide tube
22, 32, 122, 422, 432, 522, 622: Tube wall
221, 222, 321, 322, 4221, 4222, 4321, 4322, 5221, 6221: Wide wall
223, 224, 4223, 4224, 5223, 5224, 6223, 6224: Narrow wall
23, 33, 423, 433: Short wall
441, 541, 641: Housing
4411, 5411, 6411: Recess
451, 551, 651: Resin substrate

The invention claimed is:

1. A filter device, comprising: a filter comprising a substrate made of a dielectric, a pair of wide walls being constituted by a first conductor layer and a second conductor layer, respectively, and covering respective opposite surfaces of the substrate, and narrow walls being constituted by post walls which are provided inside the substrate; and a first waveguide tube and a second waveguide tube each including a tube wall made of a conductor and being placed along the substrate, the filter further comprising:
a first columnar conductor passing through a first opening which is provided in the first conductor layer, the first columnar conductor having one end portion located inside the substrate,
a second columnar conductor passing through a second opening which is provided in the first conductor layer or the second conductor layer, the second columnar conductor having one end portion located inside the substrate,
the first waveguide tube being placed such that the first columnar conductor passes through an opening which is provided in the tube wall of the first waveguide tube and such that another end portion of the first columnar conductor is located inside the first waveguide tube,
the second waveguide tube being placed such that the second columnar conductor passes through an opening which is provided in the tube wall of the second waveguide tube and such that another end portion of the second columnar conductor is located inside the second waveguide tube.

2. The filter device as set forth in claim 1, wherein the filter further comprises one or more partition walls being constituted by post walls provided inside the substrate and dividing a region surrounded by the pair of wide walls and the narrow walls into a plurality of resonators, the one or more partition walls having respective coupling windows.

3. The filter device as set forth in claim 1, wherein the first columnar conductor and the second columnar conductor are each divided into a first part and a second part, the first part being embedded in the substrate and having one end portion which reaches a surface of the substrate, the second part protruding through the substrate, and the first part and the second part are connected to each other by an electrically conductive connecting member.

4. The filter device as set forth in claim 3, wherein the second part of each of the first columnar conductor and the second columnar conductor is embedded in a block made of a dielectric, and an end portion of the second part on a side facing the first part reaches a surface of the block.

5. The filter device as set forth in claim 1, further comprising:
a housing made of a metal, the housing including a first tubular space, a second tubular space, and a recess, the first tubular space functioning as a propagation region of the first waveguide tube, the second tubular space functioning as a propagation region of the second waveguide tube, the recess accommodating the filter; and
a resin substrate holding the filter in a state in which the filter is sandwiched between the resin substrate and the housing,
wherein in the filter, the second opening provided in the first conductor layer or the second conductor layer is provided in the first conductor layer,
the recess and the first tubular space communicate with each other via a first opening which is provided at a boundary between the recess and the first tubular space,
the recess and the second tubular space communicate with each other via a second opening which is provided at a boundary between the recess and the second tubular space,
the filter is placed such that the another end portion of the first columnar conductor and the another end portion of the second columnar conductor are located inside the first tubular space and the second tubular space, respectively, and such that the first conductor layer seals the first opening and the second opening which are provided at the boundaries.

6. The filter device as set forth in claim 5, further comprising:
a pressure applying member which applies pressure to a skirt, which is a rim of the housing around the recess, and to the resin substrate in such a direction that the filter is sandwiched between the skirt and the resin substrate,
wherein a height of the skirt is so set that the skirt and the resin substrate are spaced away from each other.

7. The filter device as set forth in claim 5, further comprising:
a pressure applying member which applies pressure to a skirt, which is a rim of the housing around the recess, and to the resin substrate in such a direction that the filter is sandwiched between the skirt and the resin substrate,
wherein a height of the skirt is so set that the second conductor layer of the filter and the resin substrate are spaced away from each other, and
a resin material is filled in an air gap between the second conductor layer and the resin substrate.

8. The filter device as set forth in claim 5, further comprising:
a pressure applying member which applies pressure to a skirt, which is a rim of the housing around the recess, and to the resin substrate in such a direction that the filter is sandwiched between the skirt and the resin substrate,
wherein a height of the skirt is so set that the second conductor layer of the filter and the resin substrate are spaced away from each other, and
the second conductor layer is connected to the resin substrate by a plurality of connecting members.

9. A filter, comprising:
a substrate made of a dielectric;
a pair of wide walls being constituted by a first conductor layer and a second conductor layer, respectively, and covering respective opposite surfaces of the substrate; and
narrow walls being constituted by post walls which are provided inside the substrate,
the filter further comprising:
a first columnar conductor passing through a first opening which is provided in the first conductor layer, the first columnar conductor having one end portion located inside the substrate;
a second columnar conductor passing through a second opening which is provided in the first conductor layer or the second conductor layer, the second columnar conductor having one end portion located inside the substrate; and
one or more partition walls being constituted by post walls provided inside the substrate and dividing a region surrounded by the pair of wide walls and the narrow walls into a plurality of resonators, the one or more partition walls having respective coupling windows.

10. The filter as set forth in claim 9, wherein the first conductor layer has a first region provided in advance in a vicinity of the first opening, the first region allowing part of a tube wall of a first waveguide tube to be placed in the first region, and the first conductor layer or the second conductor layer has a second region provided in advance in a vicinity of the second opening, the second region allowing part of a tube wall of a second waveguide tube to be placed in the second region.

* * * * *